Aug. 26, 1924.
C. C. FARMER
1,505,951
FLUID PRESSURE BRAKE
Filed Oct. 4, 1923
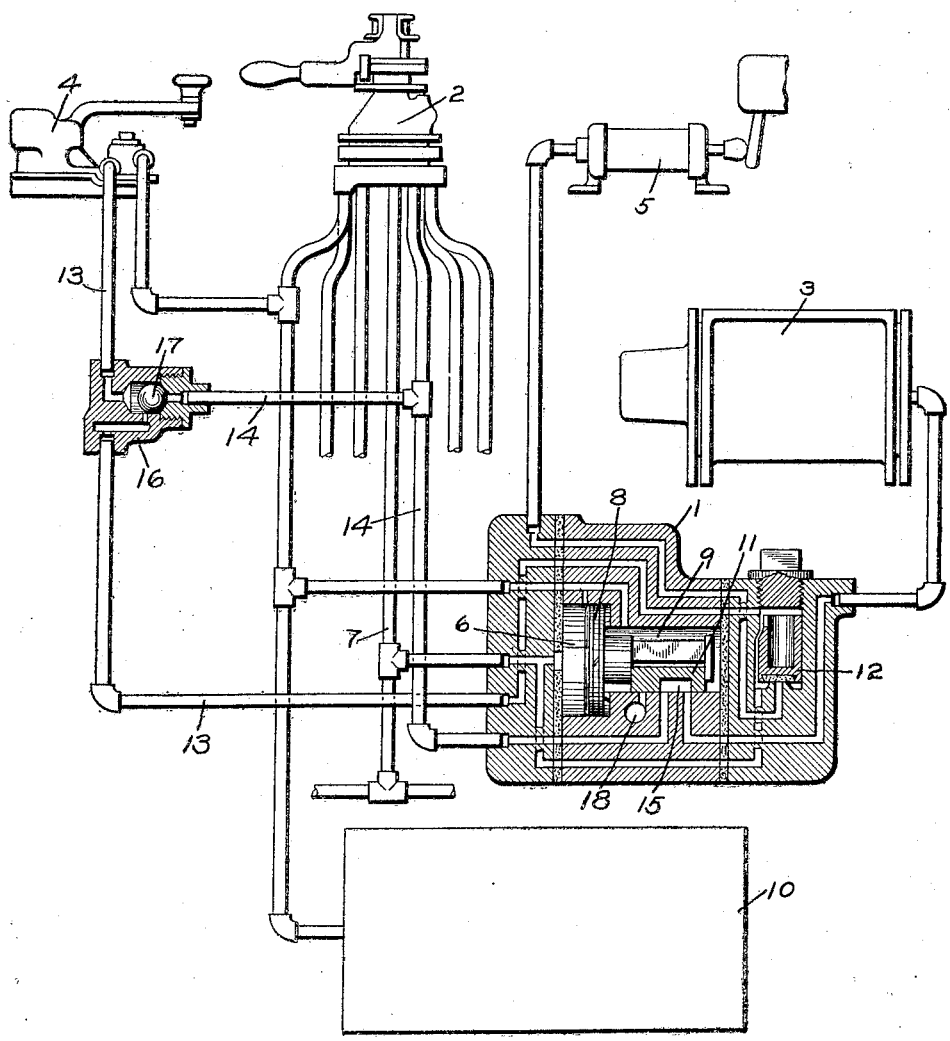
INVENTOR
CLYDE C. FARMER
BY Wm. W. Cady
ATTORNEY Patented Aug. 26, 1924.

1,505,951

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 4, 1923. Serial No. 666,616.

*To all whom it may concern:*

Be it known that I, CLYDE C. FARMER, a citizen of the United States, residing at Pittsburgh, in the county of Allegheny and State of Pennsylvania, have invented new and useful Improvements in Fluid-Pressure Brakes, of which the following is a specification.

This invention relates to fluid pressure brake and car door controlling apparatus.

It has heretofore been proposed to provide a safety car control equipment in which upon release of the controller handle, fluid is vented from a safety control pipe to effect a reduction in pressure in the emergency brake pipe and the operation of an emergency valve device, so that an emergency application of the brakes is produced.

It has also been proposed to provide a check valve device which is adapted to be operated when the pressure in the straight air pipe has been increased to a predetermined degree for cutting off communication through the safety control pipe, so as to prevent the emergency action of the emergency valve device.

In connection with the above equipment, door engines are employed which are so designed that when the emergency brake pipe pressure is reduced, the fluid pressures on the door engine are balanced, so that the car doors may be freely opened at will.

It has been found that in some instances, when a light straight air application of the brakes is made, the pressure in the safety control pipe may be reduced sufficiently to cause the safety control features to function when the hand is removed from the controller handle.

The check valve above referred to may then be operated by straight air pressure to cut off communication through which fluid is vented from the safety control pipe and then prevent the usual full reduction in brake pipe pressure, with the result that fluid under pressure is trapped in the emergency brake pipe, thereby preventing the balancing of the fluid pressures on the car door engine, so that the car doors cannot be opened.

The principal object of my invention is to provide an equipment of the above character, having means for preventing the occurrence of the above described undesired action.

In the accompanying drawing, the single figure is a diagrammatic view of a safety car control equipment embodying my invention.

As shown in the drawing, the equipment may comprise an emergency valve device 1, a brake valve device 2, a brake cylinder 3, a safety controller handle device 4, and a power circuit controlling device 5.

The emergency valve device 1 may comprise a casing having a piston chamber 6, connected to the emergency brake pipe 7, and containing piston 8, and a valve chamber 9, connected to the main reservoir 10 and containing a slide valve 11 adapted to be operated by piston 8.

In the casing of the emergency valve device 1 is mounted a relay valve 12, one side of which is connected to the safety control pipe 13, said relay valve being operable upon a reduction in pressure in the safety control pipe for opening communication through which fluid is vented from the emergency brake pipe 7.

In release position of the emergency slide valve 11, the usual straight air pipe 14 is connected to the brake cylinder 3, through a cavity 15 in said slide valve.

Interposed in the safety control pipe 13 is a check valve casing 16 containing a ball check valve 17 which is adapted to seat in one direction to cut off communication through the safety control pipe 13.

Said check valve is subject to the pressure in the straight air pipe 14, so that when the straight air pipe is supplied with fluid under pressure said check valve will move to the above mentioned seated position.

The apparatus as above described corresponds with that heretofore proposed and according to my invention, means are provided for venting fluid from the straight air pipe in the emergency position of the emergency valve device. For this purpose, an exhaust port 18 opens to the seat of the emergency slide valve 11, which is so positioned that when the slide valve moves to emergency position, the straight air pipe 14 is connected through cavity 15 with said exhaust port.

In operation, it will be evident that whenever the emergency piston 8 is shifted to emergency position, regardless of whether a straight air application has previously been made, the straight air pipe 14 will be connected through cavity 15 in the slide valve 11 with exhaust port 18 and consequently the check valve 17 will not be operated by pressure in the straight air pipe to cut off communication through the safety control pipe 13. With the controller handle 4 released, the safety control pipe will be opened to the atmosphere through the usual pilot valve (not shown), so that the relay valve 12 will be maintained in its open position, thus ensuring the full venting of fluid from the emergency brake pipe 7 by operation of the relay valve.

The emergency brake pipe being vented as above described, the fluid pressures on the car door engine will be balanced, permitting the car doors to be opened, as desired.

Having now described my invention, what I claim as new and desire to secure by Letters Patent, is:—

1. In a fluid pressure brake, the combination with a safety control pipe, an emergency brake pipe, and means operated upon a reduction in pressure in the safety control pipe for venting fluid from the emergency brake pipe, of a straight air pipe, means operated by pressure in the straight air pipe for cutting off communication through the safety control pipe, and an emergency valve device operated upon a reduction in brake pipe pressure for effecting an application of the brakes and adapted in emergency position to vent fluid from said straight air pipe.

2. In a fluid pressure brake, the combination with a brake pipe and an emergency valve device operated upon a reduction in brake pipe pressure for effecting an emergency application of the brakes, of a straight air pipe through which fluid is supplied to effect an application of the brakes, said emergency valve device having means for venting fluid from the straight air pipe upon movement to emergency position.

3. In a fluid pressure brake, the combination with a brake pipe and a brake cylinder, of a piston subject to brake pipe pressure, a straight air pipe, and a valve operated by said piston upon a reduction in brake pipe pressure for supplying fluid to the brake cylinder and for connecting said straight air pipe to the atmosphere.

4. In a fluid pressure brake, the combination with a brake pipe and a brake cylinder, of a piston subject to brake pipe pressure, a straight air pipe, and a valve operated by said piston and having one position for connecting the straight air pipe to the brake cylinder and another position in which fluid is supplied to the brake cylinder and in which fluid is vented from said straight air pipe.

In testimony whereof I have hereunto set my hand.

CLYDE C. FARMER.